(12) United States Patent
Hendrickson et al.

(10) Patent No.: US 11,825,983 B2
(45) Date of Patent: *Nov. 28, 2023

(54) MILK FROTHING APPARATUS

(71) Applicants: Kyle Johan Hendrickson, Wenatchee, WA (US); Silas Hilliard, Wenatchee, WA (US)

(72) Inventors: Kyle Johan Hendrickson, Wenatchee, WA (US); Silas Hilliard, Wenatchee, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/962,212

(22) Filed: Oct. 7, 2022

(65) Prior Publication Data
US 2023/0276979 A1    Sep. 7, 2023

Related U.S. Application Data

(63) Continuation of application No. 16/217,319, filed on Dec. 12, 2018, now Pat. No. 11,497,344.

(60) Provisional application No. 62/597,813, filed on Dec. 12, 2017.

(51) Int. Cl.
| | |
|---|---|
| *A47J 31/44* | (2006.01) |
| *G06F 3/04817* | (2022.01) |
| *A47J 31/52* | (2006.01) |
| *A47J 31/40* | (2006.01) |

(52) U.S. Cl.
CPC .......... *A47J 31/4489* (2013.01); *A47J 31/402* (2013.01); *A47J 31/4482* (2013.01); *A47J 31/52* (2013.01); *G06F 3/04817* (2013.01)

(58) Field of Classification Search
CPC .. A47J 31/4489; A47J 31/402; A47J 31/4482; A47J 31/52; A47J 31/44
USPC .......................... 99/275, 279, 293, 300, 452
See application file for complete search history.

(56) References Cited

U.S. PATENT DOCUMENTS

| | | | |
|---|---|---|---|
| 2007/0017376 A1* | 1/2007 | Oehninger | A47J 31/4482 99/279 |
| 2013/0239819 A1* | 9/2013 | Giua | A47J 43/0705 99/291 |

* cited by examiner

*Primary Examiner* — Phuong T Nguyen
(74) *Attorney, Agent, or Firm* — FisherBroyles, LLP

(57) ABSTRACT

A milk-frothing apparatus for preparing high quality microfoamed milk for coffee drinks consistently and at high volume. A machine having one or more steaming stations includes an elevator at each station with an elevator-mounted steaming wand have a precise angle at the discharge end. The elevator-mounted steaming wand is configured to travel from an upward stowed status to a downward deployed status to insert the discharge end of the elevator-mounted steaming wand into milk inside a pitcher precisely located on the machine. A steam boiler is hydraulically coupled to the elevator-mounted steam wand via flexible tubing and an infrared sensor monitors the temperature of the pitcher during a downward deployed status. An LCD screen with operator controls and displays oriented to coincide spatially with the elevator indicate different operational settings selected by the user and related to machine operation.

17 Claims, 14 Drawing Sheets

MILK FROTHING APPARATUS

PRIORITY CLAIM

This application claims priority from U.S. Provisional Application No. 62/597,813 filed Dec. 12, 2017, which is hereby incorporated by reference in its entirety as if fully set forth herein.

COPYRIGHT NOTICE

This disclosure is protected under United States and/or International Copyright Laws. © 2017, 2018 Kyle Johan Hendrickson. All Rights Reserved. A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

FIELD OF THE DISCLOSURE

The present invention is directed generally to the preparation of coffee drinks, and more specifically to coffee drinks containing foamed ingredients such as milk.

BACKGROUND

Within the coffee-drink industry, milk is conventionally steamed by using one or two steam wand stations built into commercial espresso machines. Such machines typically have one to four stations (also known as group heads) for brewing (also known as pulling or extracting) espresso shots. A single group head machine typically has one steam wand. Two through four group head machines typically have two steam wands. Steam wands are conventionally located on the left or right side of the front of the machine, or on both sides of the machine. Some vendors of custom espresso equipment also offer standalone steam wand stations that can be mounted into a counter. Some high volume coffee shops have also installed standalone steam wands after recognizing their need for additional production capacity for steaming milk.

Steamed milk is a required ingredient for all hot espresso drinks that contain milk (e.g., lattes, cappuccinos, mochas, macchiatos). In the specialty coffee industry, the most skillfully steamed milk is generally referred to as "micro-foamed" milk. Micro-foam is typically achieved when the milk has been skillfully steamed by a barista such that tiny air bubbles are formed and mixed into the milk during the steaming process. The consistency of micro-foamed milk allows the barista to combine the milk into the espresso in such a way that an artistic design can be presented to the customer on the top of their espresso drink. This design is often called "latte art" in the industry. Latte art generally acts as a stamp or guarantee of quality of the drink, because it is not possible to achieve attractive latte art in a drink unless both the espresso shots were extracted and the milk was steamed with extremely high quality. Not only are high-end espresso customers willing to pay higher prices for this higher quality, most of them now expect micro-foamed milk and some kind of latte art in their drinks.

Additionally, properly micro-foamed drinks add to the overall pleasant experience of the customer. The micro-foam, when properly made, has a texture that provides an attractive mouthfeel and the steaming tends to make the milk taste sweeter, which to some, improves the flavor of the coffee drink.

High quality espresso drinks with milk have traditionally resulted from the work of highly skilled baristas, in particular with their ability to steam milk and generate micro-foamed milk. There are costs associated with hiring skilled baristas and/or training new employees in the micro-foaming technique, and there also may be a variability of quality across employees. Both of these elements contribute to quality. As a result, improvements are clearly needed in current machines and processes used to deliver high-end espresso drinks that contain micro-foamed ingredients such as milk.

SUMMARY OF INVENTION

In a preferred embodiment of the invention, a milk steaming machine enables a barista to create a high volume of high-quality micro-foamed steamed milk as a result of physical and structural components of the machine which are designed to embody at least one critical dimension and/or practice of making micro-foamed milk. With certain dimensions and/or micro-foaming practices built directly into the mechanical aspects of the machine, the preferred embodiment of the invention can (a) decrease the costs of training new employees in micro-foaming technique, (b) decrease the variability of quality across employees, and (c) increase an employee's ability to generate a greater volume of micro-foam milk, thereby ultimately improving the quality, consistency, and volume of micro-foam milk that a business can produce.

High quality steamed milk steam is a required ingredient of every premium espresso drink that includes hot milk and there is a need for commercial equipment that offers a way to generate micro-foamed milk at both high volume and high quality. The rising cost of labor and the increasing demand for high-labor-intensity, high-quality espresso drinks create a market opportunity for equipment innovation for micro-foamed milk that lowers the labor cost, increases the volume and maintains or improves quality.

Embodiments of the invention solve specific problems that are not addressed or contemplated by conventional equipment/machines, including, but not limited to: (i) enabling an employee to singularly produce a high-volume of high-quality micro-foamed milk that can be used in premium espresso drinks, for example, to produce latte art on the surface of such drinks, or (ii) keeping an employee informed of the status of the milk steaming process (which allows for better multi-tasking) and the age of the steamed milk (which ensures product quality of the extremely perishable micro-foamed milk). Several innovative features are combined in the preferred and alternative embodiments to solve the identified problems of current systems and techniques, as discussed in more detail below.

Various dimensions and components for producing micro-foamed milk (discussed more thoroughly below) are included into embodiments of the invention and thus remove many of the technical skills and training required to properly steam milk to successfully generate micro-foamed milk. These dimensions and components have the ability to yield a more consistent and higher quality product with less human intervention. For instance, although a barista using an embodiment of the invention may go through the steps of filling the pitcher with milk to the proper height, placing the filled pitcher securely into the steaming station, lowering the steam wand elevator, selecting the desired ending milk temperature, removing the finished steamed milk, and pouring latte art, the machine according to an embodiment of the present invention only requires the barista have the skill and technique to properly fill the milk pitcher to the proper level and choose a temperature setting. The remaining steps, dimensions (e.g., timing, placement, and angle of the pitcher of the milk relative to the steam wand, temperature), etc. are resolved and kept consistent through mechanical means and structures incorporated in embodiments of the present invention.

Embodiments of the invention afford high volumes of micro-foamed milk by enabling efficient multi-tasking by clearly displaying to the barista the status of both the "in-process" steaming of milk on each steaming station (if the machine is equipped with multiple stations) and also the age of any "finished" steamed milk. Knowing the status of the steaming process and/or age of finished inventory for each station enables the barista to have a large number (far greater than any other machine) of active steaming stations working together at the same time. This allows a barista the ability to multitask while still maintaining a high level of quality.

As previously discussed, there are conventional espresso machines with four group heads (brewing stations), with typically one or two built-in or stand-alone steam wand stations. However, there are no machines that enable a barista to steam milk on four stations and match the potential throughput of a four group head espresso machine for various reasons mentioned in this disclosure, including but not limited to the difficulties as a result of micro-foamed milk being extremely perishable and a barista's inability to multitask while maintaining a standard of quality. Embodiments of this invention are the first machines to match throughput of milk and espresso (for three- and four-group head espresso machines) on a one-to-one basis to this or any extent. Embodiments of this invention reduce the milk steaming bottleneck in the drink preparation process and allow businesses like cafés to efficiently utilize the full value of an espresso machine with one or more group heads. While the milk frothing machine according to the present invention is certainly suitable for use with single group head espresso machines, it's true benefits, including increased throughput and high quality micro-foam, become most evident when used with espresso machines have two (2) or more group heads.

In a preferred embodiment of the invention, a single-station or multi-station milk frothing device utilizes an elevator-mounted steaming wand that is hydraulically coupled to a steam boiler via flexible tubing. In this embodiment, the elevator is moved up and down each time a pitcher of milk is steamed. To minimize the significant repetitive stress on the steam hose connected to each elevator, the hoses connecting the boiler to the steam wand elevator are flexible. This effectively allows for freedom of movement for the elevator and steam wand while avoiding repetitive stress and consequent wear and deterioration of the machine.

Other examples of advantageous features, which can be included in one or more embodiments, include one or more locator devices, such as rods, that protrude from the face of the machine rather than from the platform on which the pitchers sit while steaming. Among other benefits, the placement of the locator device(s) allows for easy cleaning. Similarly, use of an infrared thermal sensor rather than a physical thermometer simplifies the equipment attached to the elevator, which lowers expected maintenance and repair cost and improves ease of cleaning.

In yet another embodiment of the invention, sensors are utilized to identify which size of pitcher the barista is using at each station of the steaming machine. For drinks of different sizes baristas accordingly steam different volumes of milk. The ultimate post-steaming temperatures of different volumes of milk vary when for each milk volume the steam is cut off at the same temperature, Therefore, to achieve a milk temperature that is exactly the same across varying milk volumes it is necessary to vary the steam cutoff temperature per volume of milk per different targeted end milk temperature. Consistent milk temperatures across all milk volumes are desirable and valuable for good product quality and consistency. Therefore, an embodiment of the invention preferably uses sensors to automatically detect which pitcher size the barista is steaming at each station.

Still yet another embodiment uses color sensors paired with different colors applied to and coordinated with different volume pitchers to allow the invention to register the volume of milk and apply the appropriate steaming settings. Another embodiment uses a weight sensor to recognize the volume of milk presented by the barista at each station and apply the appropriate steaming settings. Another embodiment uses a barcode scanner to scan a barcode containing milk volume information on each pitcher, which information is then used to apply appropriate milk steaming settings to that pitcher. Another embodiment uses an electrode inserted into the milk to measure the variations in conductivity of the milk across different volumes of milk, which variance information is used to determine the present volume and set steaming settings appropriately. Another embodiment uses proximity sensors to measure the dimensions of the pitcher and milk volume presented at each station, which data are then used to set the appropriate steaming settings. Another embodiment uses sensors to physically measure the dimensions of the pitcher and vertical position of the steaming wand to determine which volume of milk is being steamed. Another embodiment utilizes the temperature reading data from the steaming process to determine which volume of milk is being steamed. This temperature method compares the temperature data from heating the milk in the present pitcher to saved data from heating the different sized pitchers. When data from the present steaming operation is identified by the invention as similar to one of the pitcher sizes the machine would apply the appropriate steaming settings for the identified size of pitcher. Other embodiments would include combinations of the aforementioned types of sensors and methods of using sensors to determine the volume of milk presented to the station for steaming.

Another embodiment asks the barista to input both the target temperature setting and the present pitcher size. This manual method of setting the pitcher size for each steaming would also provide the benefit of arriving at uniform final temperatures across pitcher sizes.

According to a further embodiment of the present invention, a temperature calibration method for the machine is implemented. Temperature calibration is critical for proper functioning of the machine at high speed and high efficiency and at high quality. Manual calibration is time consuming, and could take 20-30 hours to really dial in the machine well. This would be a costly and error-prone setup process for the manufacturer or the customer. If it's not calibrated, the machine will not be very valuable since it would not cut off steaming accurately, thereby impacting the quality of the high quality micro-foam. Accordingly, a quick, accurate calibration system is desirable.

According to one embodiment, calibration takes place on a designated administrative screen or in an administrative mode, preferably in machine firmware. At least two items of known temperature would be used. For each steaming station the first known temperature would be entered. Then the item of the corresponding temperature would be presented for measurement to each station and that temperature logged into the system by the user by pressing a button (physical or touchscreen) while the item's temperature is being read by the thermal sensor. This process tells the machine what its raw sensor reading calibrates to in degrees Fahrenheit or Celsius. This process is repeated for each station and for at least one other item of known temperature across all stations. Once the temperature calibration data has been recorded, the user runs a calibration software program in the machine. This program derives a linear equation that fits the stored calibration temperature data for each steaming station. The purpose of this calibration equation is to translate the level of raw sensor data at each station into temperature readings. This allows each steaming station to terminate the milk steaming process accurately at each temperature setting's predetermined cutoff point. Such a calibration program and procedure may also be necessary to calibrate pitcher colors or barcodes or weights or whatever is used to determine pitcher sizes so that the machine can be set up to properly recognize the pitcher sizes presented to it.

In summary, embodiments of the invention enable the consistent production of a higher volume of steamed milk, with a matched or higher quality than current manual techniques, with less user intervention. Embodiments allow a single barista who is not necessarily a skilled milk steamer to produce high quality micro-foamed milk with a higher consistency of quality and a much higher volume than is possible with any existing espresso industry equipment.

BRIEF DESCRIPTION OF THE DRAWING FIGURES

Preferred and alternative embodiments of the present invention are described in detail below with reference to the following drawings.

Figure 1:
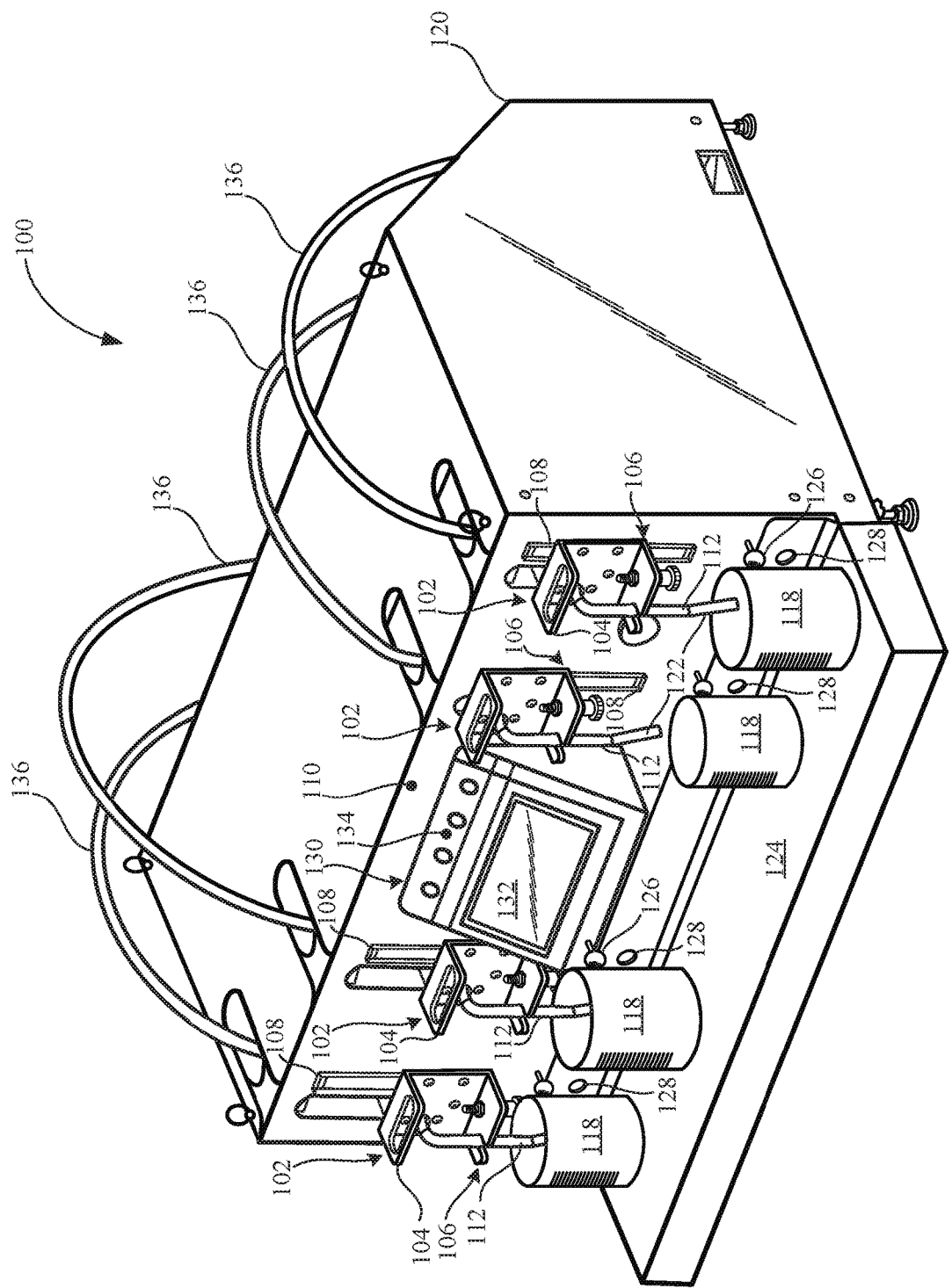
FIG. 1 depicts, schematically, a front perspective view of a milk frothing machine in accordance with a preferred embodiment of the present invention having four steam stations.
Figure 2:
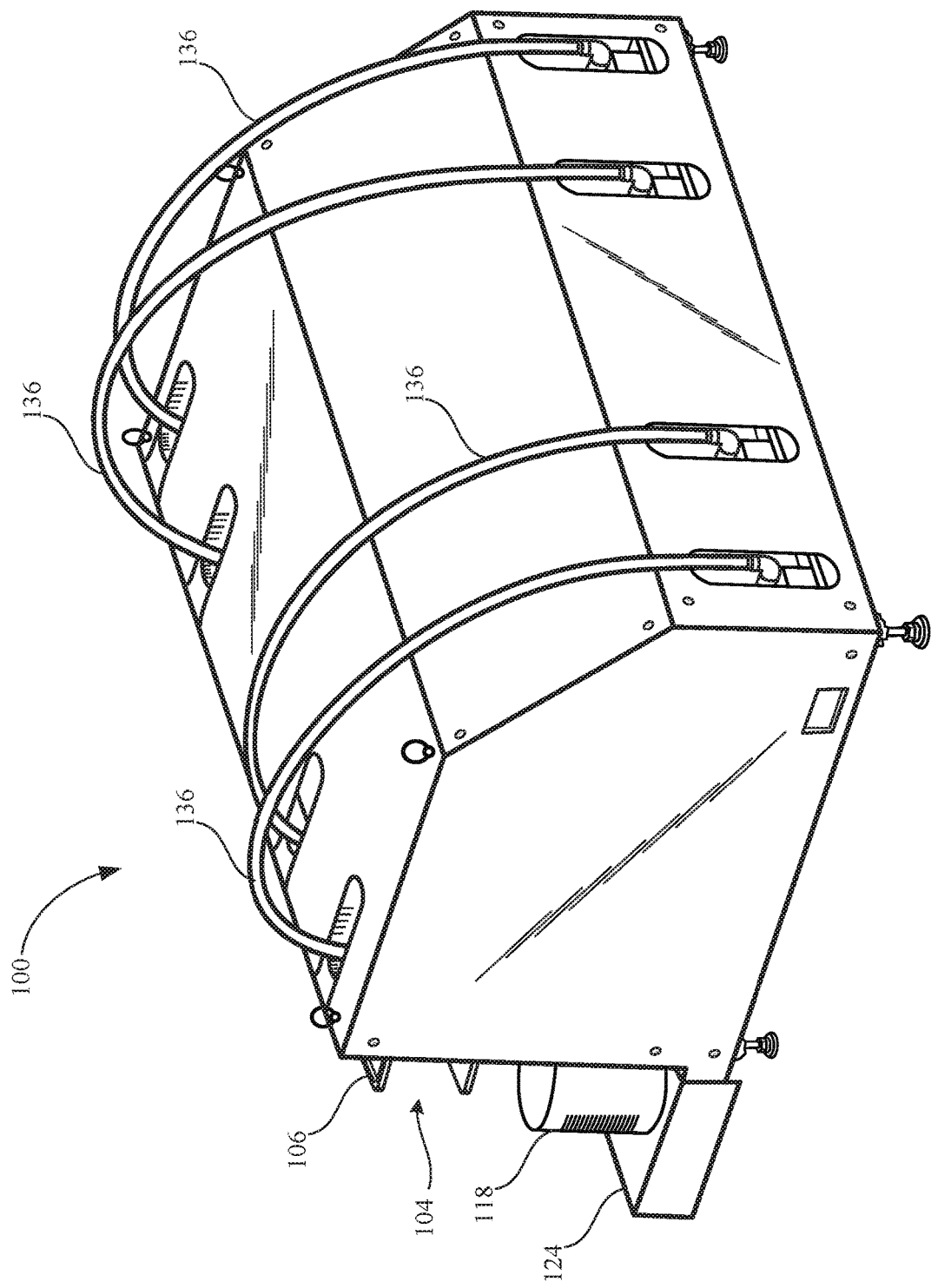
FIG. 2 depicts a back perspective view of the embodiment illustrated in FIG. 1.
Figure 8:
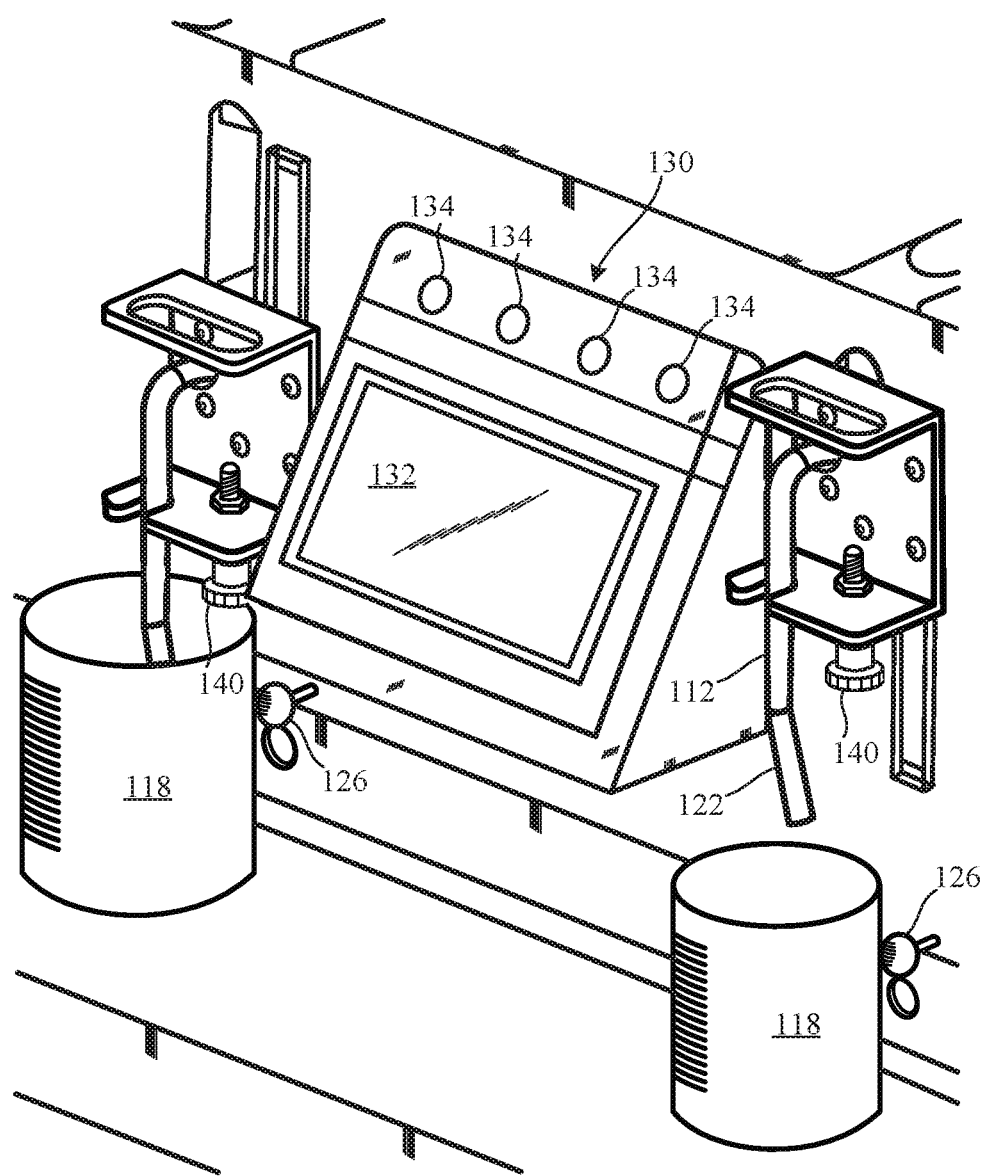
FIG. 8 depicts further features of the embodiment of the present invention illustrated in FIG. 1, including a central visual display.
Figure 9A:
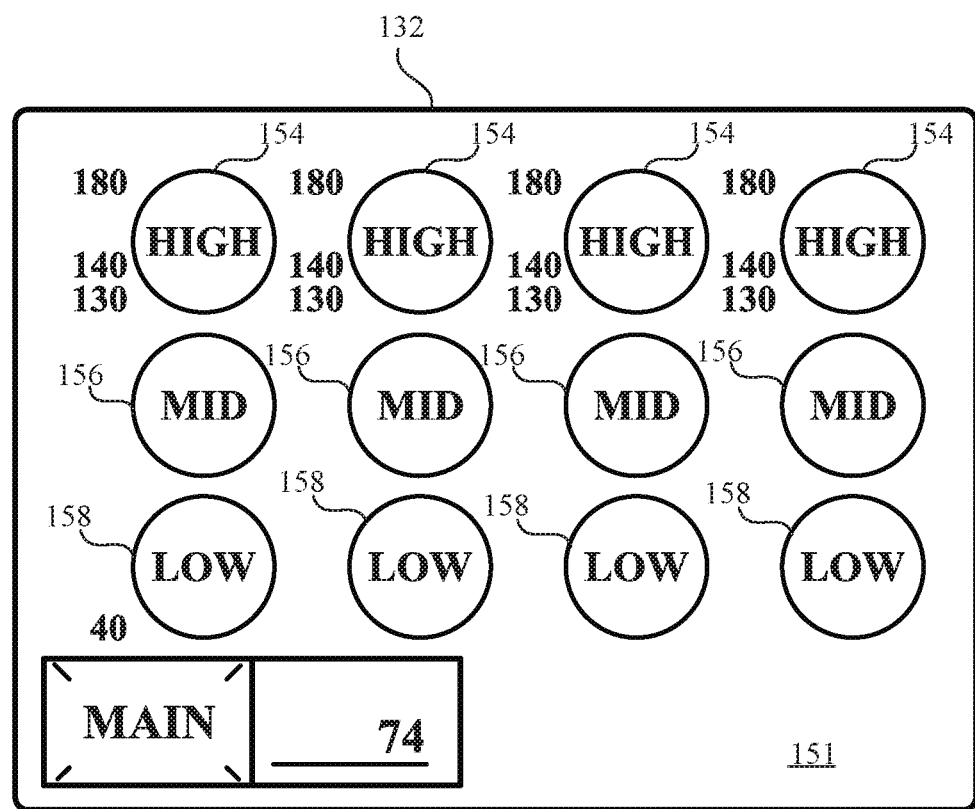
Figure 9B:
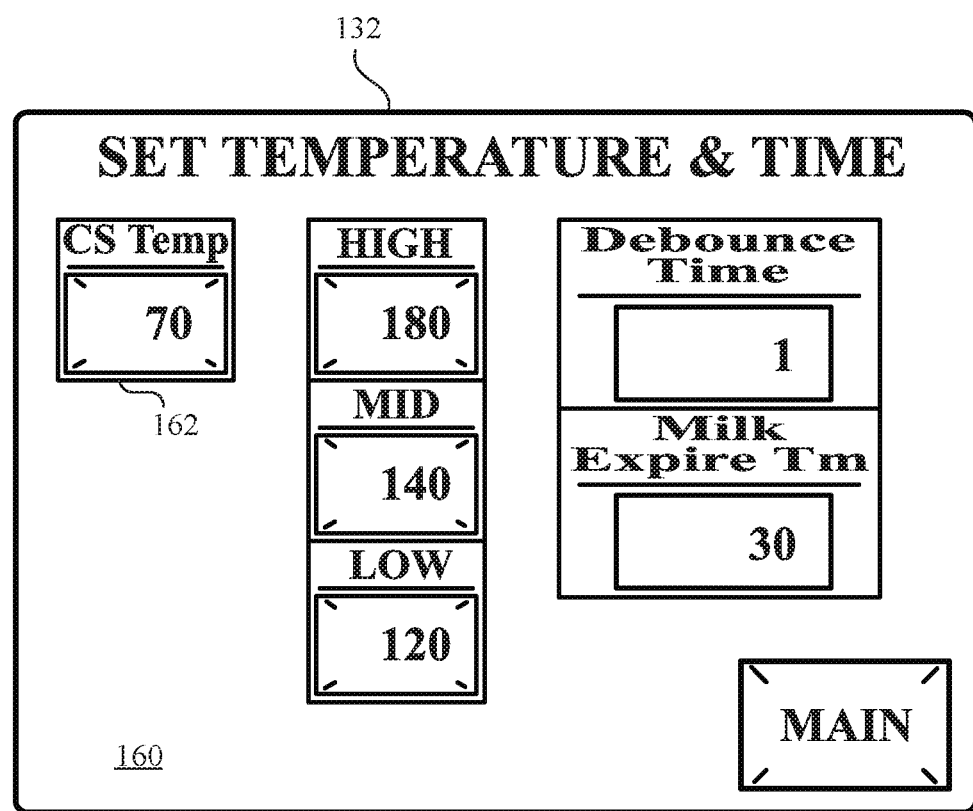
Figure 9C:
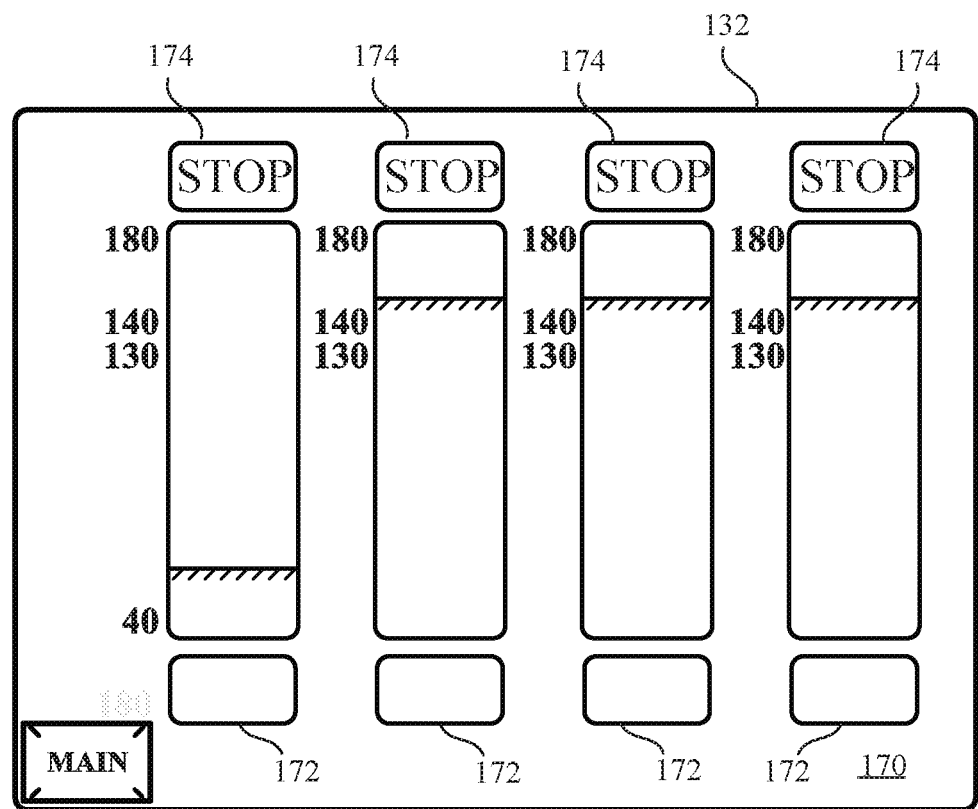
Figure 10:
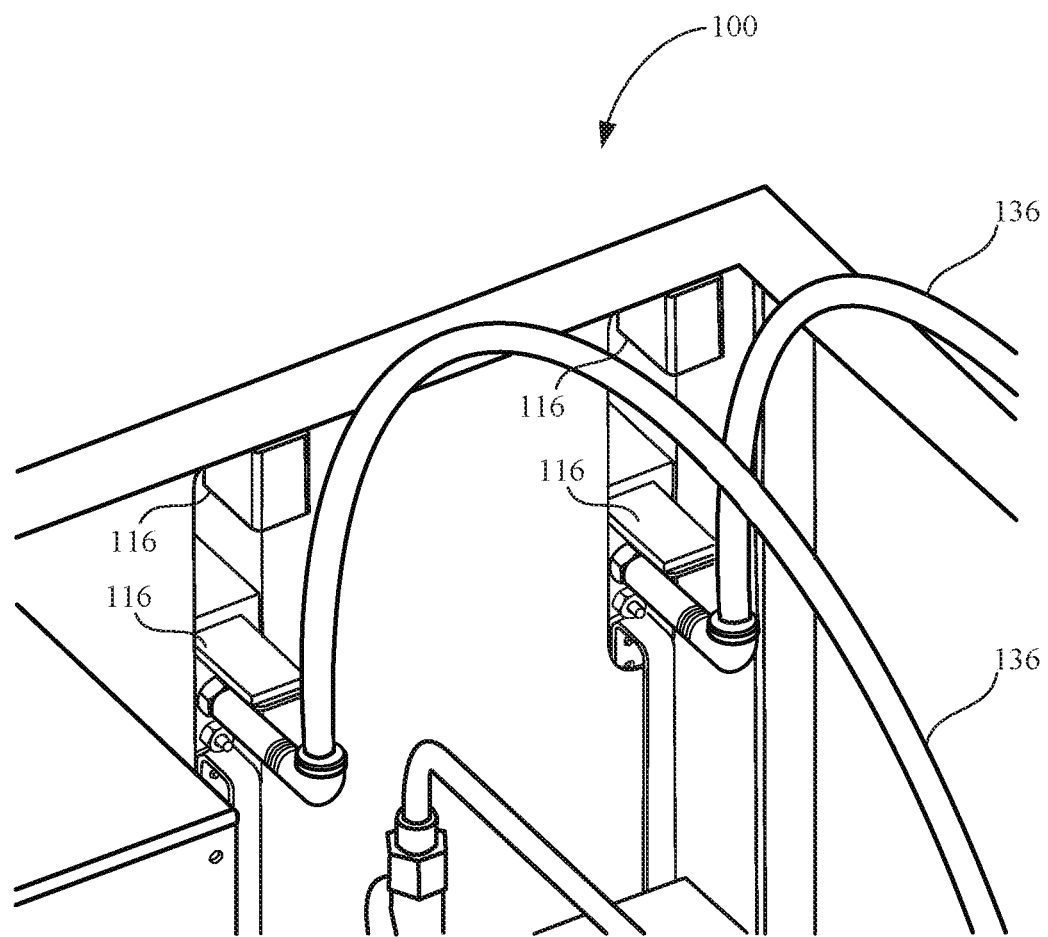
Figure 11:
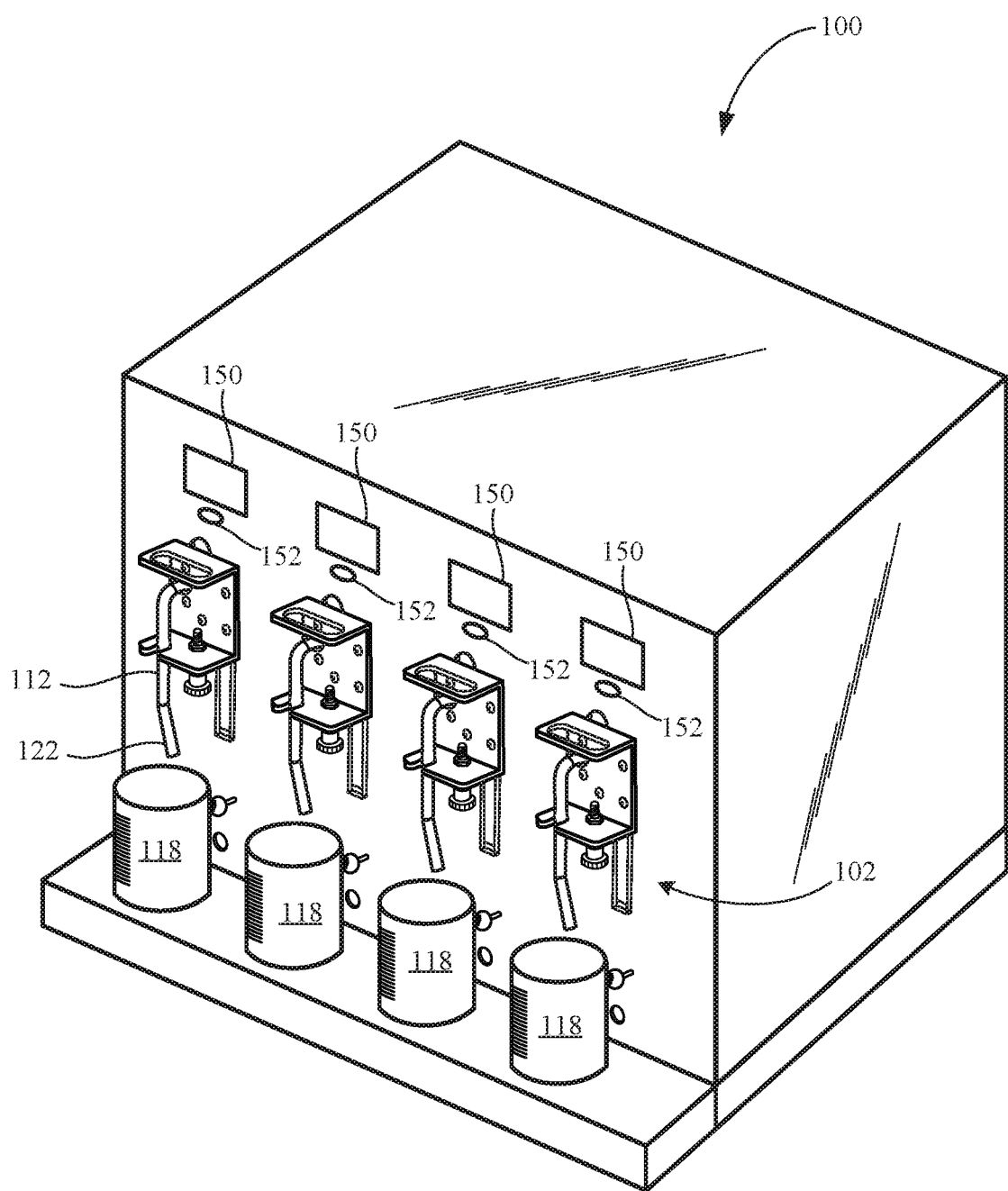
Figure 12:
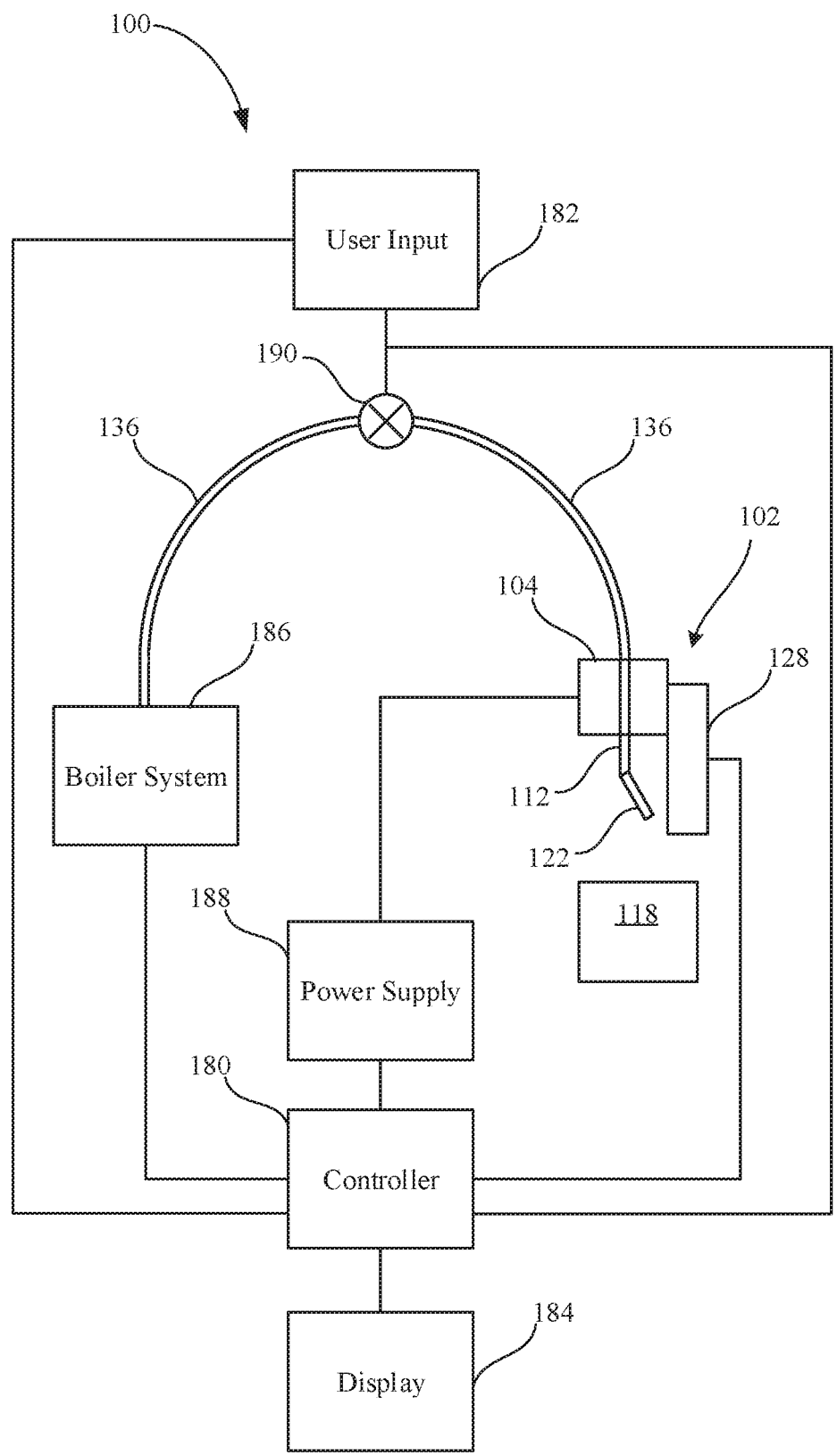

FIGS. 9A, 9B, and 9C depict various screens of the visual display in FIG. 8;

FIG. 10 depicts an internal view of features of the embodiment of the present invention illustrated in FIGS. 1 and 2, with an emphasis on steam lines;

FIG. 11 illustrates an alternative embodiment of the present invention and depicts an example of distributed controls and displays; and, FIG. 12 is a schematic block diagram of a milk frothing machine in accordance with an embodiment of the present invention.

DETAILED DESCRIPTION OF THE PREFERRED EMBODIMENT

This disclosure is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms. In addition, the headings in this application are for reference purposes only and shall not in any way affect the meaning or interpretation of the present invention.

Embodiments of the present disclosure may be operational with numerous general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the present disclosure may be described in the general context of computer-executable instructions, such as program modules, being executed by a computer and/or by computer-readable media on which such instructions or modules can be stored. Generally, program modules include routines, programs, objects, components, data structures, etc., that perform particular tasks or implement particular abstract data types. The present disclosure may also be practiced in distributed computing environments where tasks are performed by remote processing devices that are linked through a communications network. In a distributed computing environment, program modules may be located in both local and remote computer storage media including memory storage devices.

Embodiments of the present disclosure may include or be implemented in a variety of computer readable media. Computer readable media can be any available media that can be accessed by a computer and includes both volatile and nonvolatile media, removable and non-removable media. By way of example, and not limitation, computer readable media may comprise computer storage media and communication media. Computer storage media include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

Embodiments of the invention, either alone or working together, are directed towards a milk frothing station. In accordance with a preferred embodiment of the invention, the user may determine the position of a steam wand, milk depth in a milk pitcher, and pitcher location in an orientation that produces high-quality, steamed, micro-foamed milk. Hereinafter, high-quality, steamed, micro-foamed milk shall be referred to as "HQ foam." As will be discussed below, the various embodiments of the present invention produce HQ foam, which drastically reduces the training time and cost for new or unskilled employees while producing consistently high quality results.

FIGS. 1 and 2 depict an embodiment of the invention in the form of a machine 100 having four steaming stations 102 with an elevator 104 at each. It is understood, however, that the machine 100 may, in accordance with the present invention, use any number of steaming stations 102, such as one (1) or any greater number, including quantities greater than the four (4) depicted and described in the present disclosure. The elevator 104 at each station 102 is attached to a vertical rail 108 on the face 110 of the machine 100 to which a steam wand 112 is attached and which the barista moves down to insert the steam wand 112 into milk (not shown) inside a pitcher 118. As depicted in FIG. 1, the elevator 104 includes a C-shaped metal part 106, however any suitable shape that serves the elevator function for the steam wand 112 is suitable. Likewise, the elevator 104 may be fabricated from other suitable materials than metal, such, by way of example, nylon or plastic.

Moving the elevator 104 into a "down" position depresses a down position switch 114, which is described in more detail below. In this embodiment, when the barista moves the elevator 104 into the "up" position, the elevator 104 couples a magnet 116 to the machine frame 120, which holds the elevator 104 in the up position. It is understood that magnet 116 may comprise two (2) magnetic portions or a magnet (collectively a magnet) 116 on elevator 104 that is magnetically coupleable to the machine frame 110. In either case, the elevator is magnetically held in the raised or up position by magnet 116.

Figure 3:
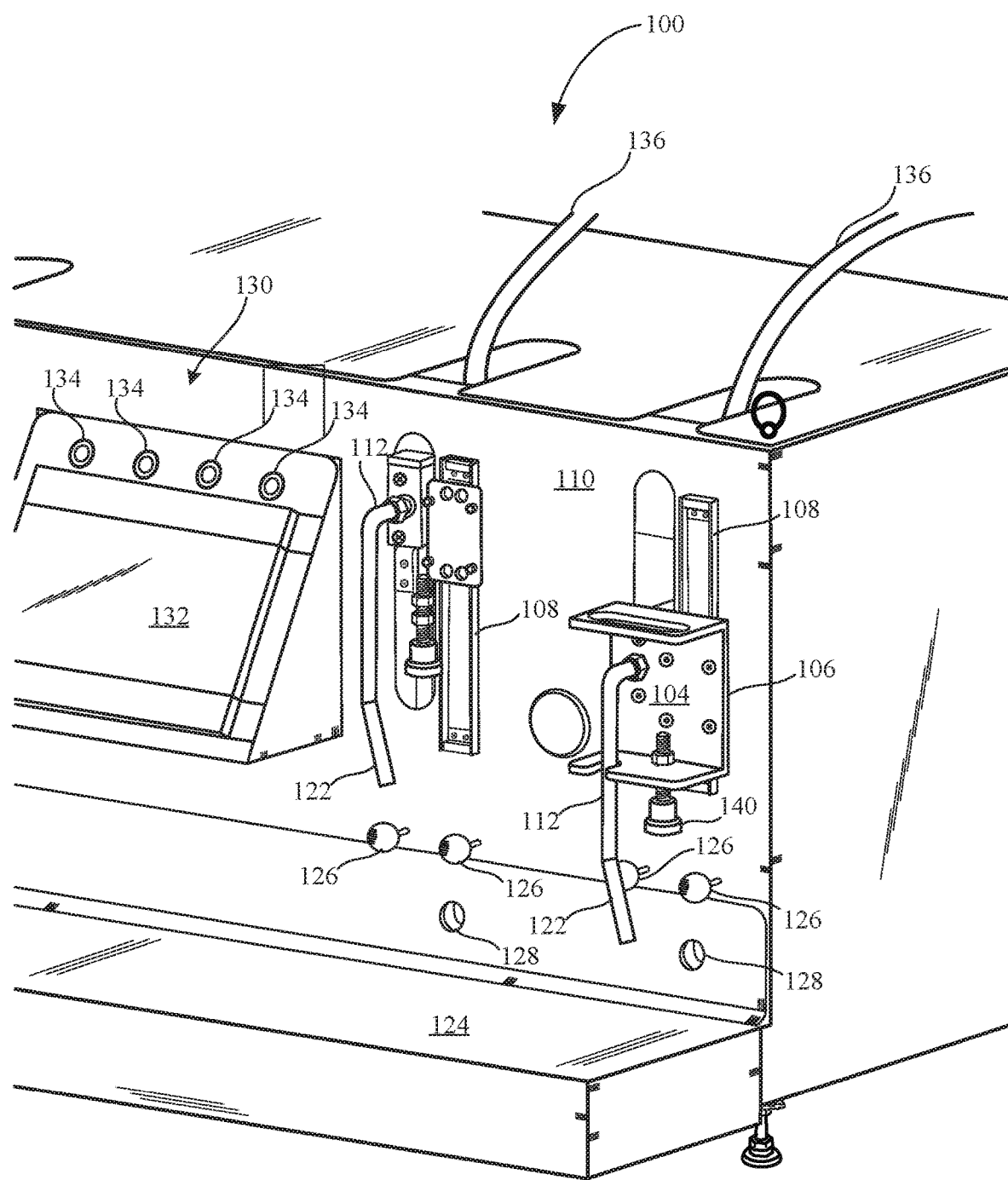
FIG. 3 depicts features of the embodiment of the present invention illustrated in FIG. 1.
Figure 4:
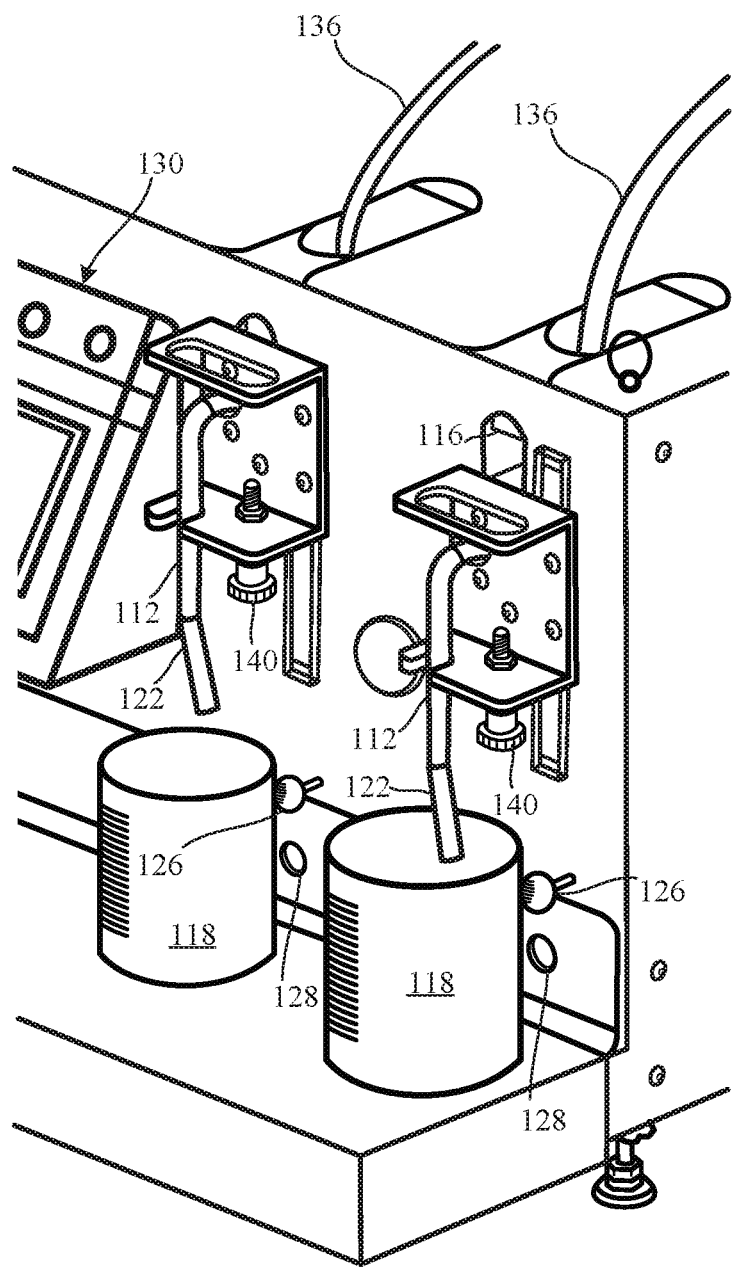
FIG. 4 depicts the embodiment of the present invention illustrated in FIG. 3 with two milk pitchers.

In this embodiment, the elevator 104 is a preferred way to insert and remove the steam wand 112 while keeping the wand in a fixed position and geometry that result in HQ foam. Examples of the elevator's (104) vertical deployment are depicted in FIGS. 3 and 4, with the elevator 104 in the left station residing in the up position while the right side elevator 104 is in the down position.

With this much vertical movement in the elevator 104, there will be significant repetitive stress on the joints, slides, tubing, or other parts which accommodate that movement. Embodiments of this invention resolve that problem by using tubing 136 that is flexible, heat and pressure resistant, and food grade.

In one embodiment, a distal portion 122 of the steam wand 112 is bent at 25 degrees to the vertical and is adjacent to a pair of pitcher locator devices or rods 126 when downwardly deployed for steaming. In this embodiment, the 25 degree bend of the steam wand 112 or tip of the wand 122 allows the vertical movement of the elevator 104 to insert the wand 112, without obstruction, into the proper location in the milk pitcher 118. In this embodiment, the elevator-positionable steam wand 112 is offset at an angle sufficiently horizontal (e.g., 25 degrees from vertical) to deliver steam that, when the wand tip 122 is placed near the internal surfaces of a milk container 118 (parked in a steaming position when container 118 is placed against a pair of adjustable stops or pitcher locator devices or rods 126), causes the milk to swirl and incorporates air into the heating milk. While the tip 122 is positioned at 25 degrees from vertical in the present embodiment, it is to be understood that other angles may also work well. For example, a tip angle between 15-55 degrees from vertical may work. Likewise a broader range of angles greater than one (1) degree and less than ninety (90) degrees may allow generation of HQ foam under appropriate conditions. Angles outside these ranges are likely to cause the milk to swirl too little or too much and introduce too much or too little air into the milk to create HQ foam.

In this embodiment, the steam wand 112 has a proximate primarily vertical portion and a distal bend or angled portion 122 continuous from the vertical portion. Alternatively, the wand may comprise a vertical portion (112) and a discrete tip (122) connected to the wand, with the tip positioned at the appropriate angle (e.g., 25 degrees). The tip 122 may be removably connected to the wand 112 and may be of the same or different material as the wand, as long as it is food-grade material.

Figure 5:
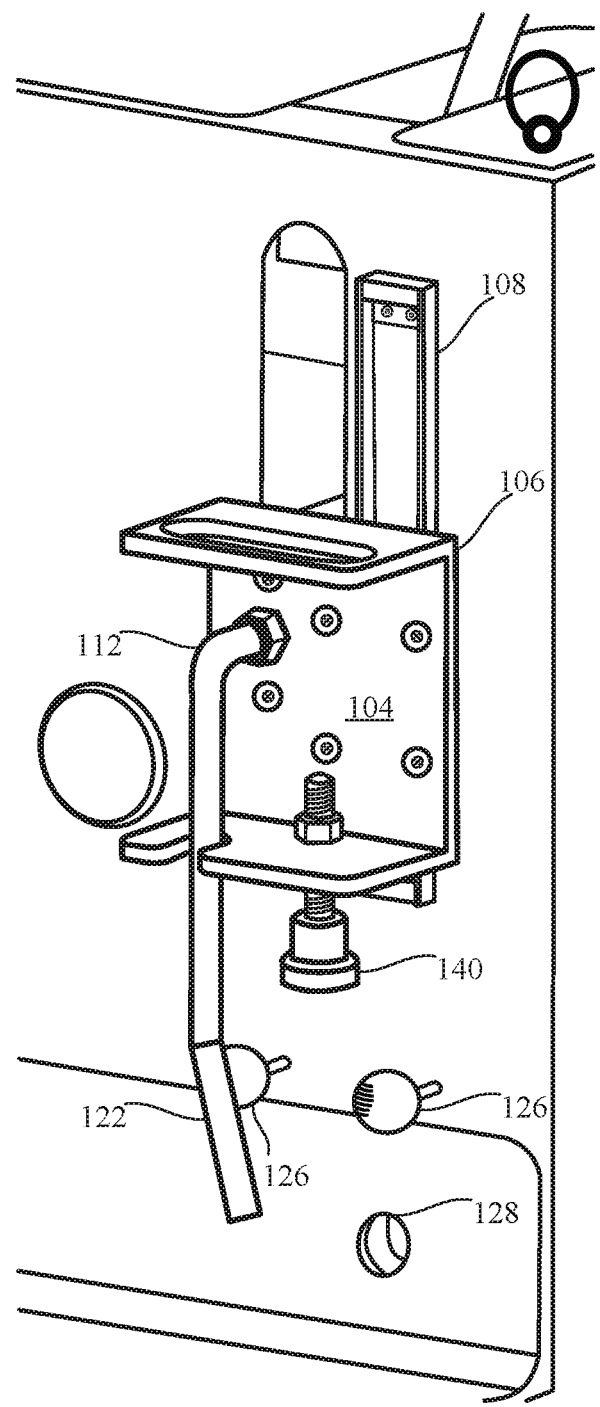
FIG. 5 depicts further features of the embodiment of the present invention illustrated in FIG. 1, including steaming wands and pitcher locator rods.

FIG. 5 depicts the arrangement of the bent steaming wand 112 (at 25 degrees) and its position relative to a pair of pitcher locator rods 126. In another embodiment not depicted, and as alluded to above, the steam tube deploys straight vertically and the approximate 25 degree element is provided by an attached tip of the wand, valve mechanism or other mechanical device that ejects stem into the milk at roughly a 25 degree angle without significantly altering the hydrodynamics of the swirling milk. In another embodiment not depicted, the steam tube deploys directly from the elevator 104 body at the approximately 25 degree from vertical angle. The angle is achieved by fixtures inside of or part of the elevator 104, and the steam tip is still placed close to, or slightly submerged in, the milk before steaming is initiated.

In accordance with further embodiments of the invention, a single Y-shaped or U-shaped locator device could be bolted or otherwise affixed to the face 110 of the machine 100 and produce the same type of functionality as the two-rod pitcher locator design 126 that is illustrated in FIG. 5 and described above.

There are various styles of steam wands that may be found on, for example, conventional automated espresso machines, like those used at Starbucks® stores or on other espresso machines designed for home use. These steaming products are not typically designed to produce high quality micro-foamed milk, but appear to automate the milk steaming process for users who are either untrained or uninterested in producing high quality micro-foamed milk.

Other steam wands attached to conventional commercial espresso machines, which are used by skilled baristas to micro-foam milk, are typically very simple and manual in design. These steam wands are typically a stainless steel tube bent in some fashion to improve ergonomics and attached to the espresso machine using a ball joint fitting that allows the barista to pull the wand up and position a pitcher of milk with the wand inside the pitcher. Traditionally, a skilled barista determines and positions the wand to create proper contact with the milk surface for micro-foaming and turns on the flow of steam. The flow of steam is typically activated with a manual valve or electronically controlled solenoid valve. The skilled barista typically continues to hold the pitcher and adjusts its position to properly incorporate air into the milk while the milk temperature rises. Some baristas may set the milk pitcher down and attend to another task for 10 to 20 seconds while the milk is steaming. Allowing the milk to steam too long, however, results in the milk burning or having milk that may burn the customer as they consume the beverage. As previously mentioned, while high quality milk steaming is a required ingredient of premium espresso drinks that include milk, the process and outcomes are heavily dependent on individual baristas. The preferred and alternative embodiments of the invention offer businesses a way to generate micro-foamed milk at both high volume and high quality without heavy reliance on skilled labor, thus ensuring a higher level of consistency in the end product.

Figure 6:
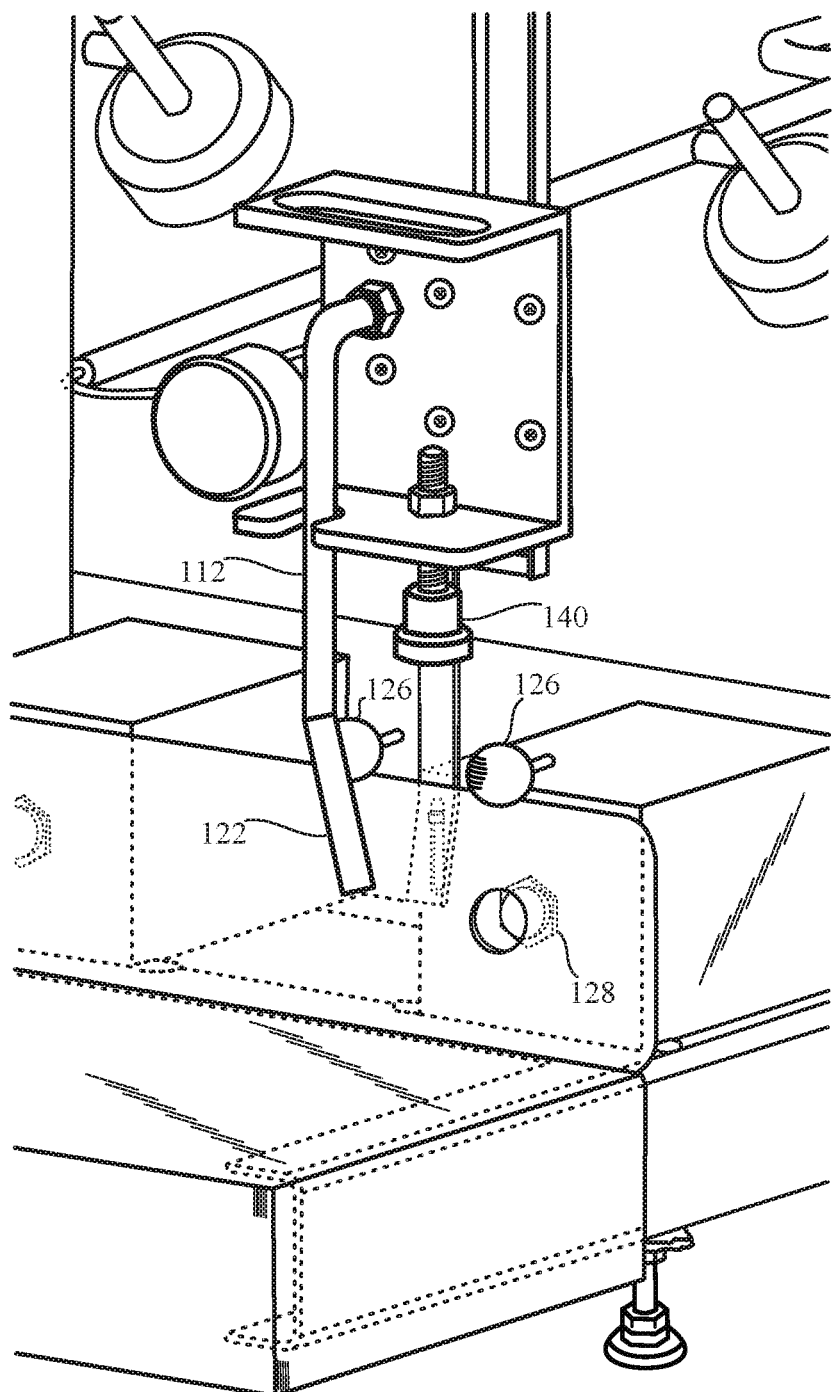
FIG. 6 depicts further features of the embodiment of the present invention illustrated in FIG. 5, including remote IR or other sensing.
Figure 7:
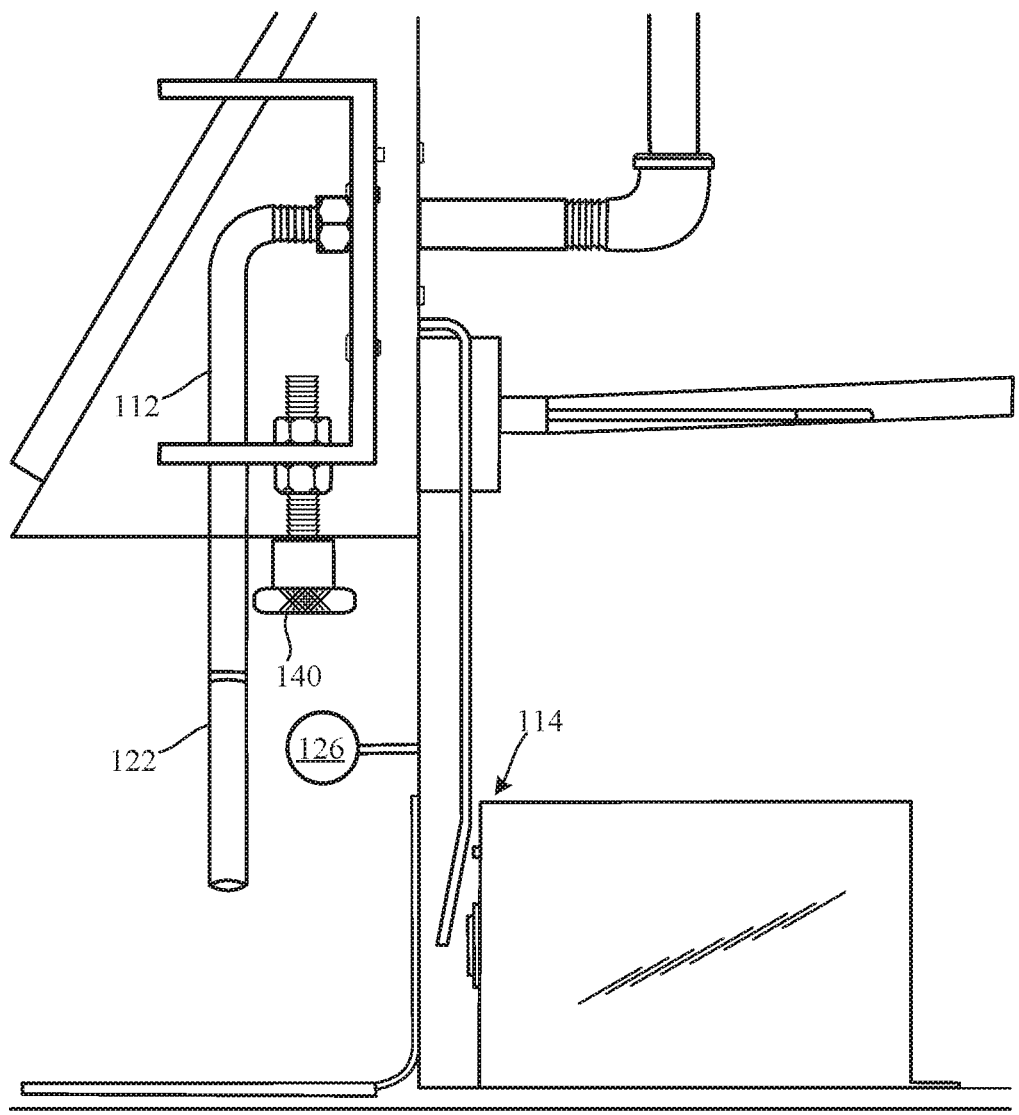
FIG. 7 depicts a side view of the embodiment of the present invention illustrated in FIG. 5.

In accordance with alternative embodiments, and as best illustrated in FIG. 6, an IR sensor 128 measures the steaming heating process via remote monitoring of the external surface of the frothing container parked in the steaming position. In this embodiment, steaming commences when circuitry confirms that start condition is met for the presence of cold pitcher/milk (to insure that overheating and/or aged milk re-steaming is avoided) and that the elevator 104 is sufficiently downward in the steaming position. FIGS. 6 and 7 depict different views of the elevator 104 operation along with remote IR. IR sensor 128 detects the temperature of the pitcher 118 (and indirectly that of the milk). In this aspect, the invention can provide a more reliable and consistent way to ensure that the steaming process is carried out at the right temperature and that no over-heating results.

Embodiments of the invention can also utilize automation features that allow an employee to conduct work in parallel with milk steaming, which can result in several economic benefits. For example, one embodiment of the invention utilizes infrared thermal sensors, which senses the temperature of the milk and milk pitcher 118 to allow the computer to stop steaming at the user-defined proper time. Unlike conventional espresso machines, which may feature an integrated thermometer with the steam wand that either simply displays the milk temperature to the barista or automatically cuts off the flow of steam into the milk, in one embodiment of the present invention, as illustrated in FIG. 8, an easy-to-discern, centralized display and control station 130 monitors the steaming status of each steaming station 102 and allows the user to input various temperature and time control parameters. Different displays of the steam frothing process are presentable on a touch screen display 132, such as an LCD, with nearby manual purge buttons 134. In accordance with this embodiment, centralized controls and graphics are displayed on the LCD touchscreen 132 and are arranged in a way that is simple and intuitive for the user and gives obvious and immediate feedback (even from a distance) on the state of all work in progress at all of the steaming stations 102. Such an arrangement is also ergonomic and durable. Alternatively, these controls (both the touch screen and hard button(s) could be decentralized and spread out to each steam station—see FIG. 11 and discussed below). Such an arrangement could improve the ergonomics of the machine 100 but may increase its complexity and decrease a user's ability to assess the status of the machine or machines at a quick glance. However, it's possible that such a decentralized configuration may increase the usability of the machine. In yet another embodiment, the manual purge buttons 134 are "soft" buttons located on the LCD screen 132.

For example, as depicted in FIG. 9A, there may be twelve buttons on an operations screen 151 of the LCD display 132, three (labeled "HIGH" 154, "MID" 156 and "LOW" 158) for each of the four steaming stations 102. The three buttons (154, 156, 158) for each station 102 activate steaming that cuts off automatically at the three different user-defined temperature thresholds (e.g., "Set Temps," of HIGH, MID and LOW). By way of example, these three (3) buttons (154, 156, 158) select ending milk temperatures of 165, 140, 130 degrees respectively. Therefore, at a "Stop Temp," selected by one of the above buttons (154, 156, 158), the machine 100 shuts a solenoid valve 190 (FIG. 12) to a boiler system 186 (also FIG. 12) stopping the flow of steam heating the milk in the milk pitcher 118. FIG. 9A depicts a display 132 showing an example of an operation screen 151 ready for user input to start the progress. FIG. 9B depicts an administrative screen 160 for setting operation variables, including a count-up timer which starts counting up when the machine 100 stops steaming because the "Stop Temp" was reached ("Milk Expire Tm"); and FIG. 9C depicts a display screen 170 showing the current temperature (57 degrees) 172, with MID Stop Temp selected, along with an emergency STOP button 174 showing at top. In other embodiments there are more or fewer Set Temps buttons and values displayed on the screen. In accordance with an embodiment of the present invention, there are multiple, such as three or four, Set Temp buttons (154, 156, 158) on the LCD screen 132 in each of four columns which correspond to the four steaming stations 102. In other embodiments there may be more or fewer steaming stations 102 and, therefore, more or fewer columns of buttons (154,156, 158) corresponding to those stations.

In other embodiments, the count up "timer" starts when the steaming stops. The screen freezes with the vertical slider all the way up and the selected temp button still showing and the count up timer in place of the STOP button at the top of the screen above each column. The count up timer does not need to take the form of a numeric time. Instead, a graphical representation of the age of the steamed milk could be used, e.g., an increasing or decreasing gauge or scale, lights changing color (for instance, green to yellow to red), or other animation or visual representation of the progressing age of the steamed milk. In other embodiments simple light bulbs could indicate a color (e.g. green then yellow then red) that indicates the age of the steamed milk for each station. In this way, information pertinent to the delivery and use of high quality and consistently produced steamed milk may be more readily conveyed to a user or barista.

In yet another embodiment, the LCD screen 132 employs one or more of the following features: (1) puts all operator controls for each steam station 102 on one screen oriented in columns corresponding spatially to the number of steaming stations 102; (2) clearly shows the user which temperature setting was selected once steaming is in-process; (3) displays a visual representation of the progress of the temperature of the milk toward the target temperature, which allows the user to manage their energy in better timing multitasking workflow; (4) displays a count up timer representing the age of that steamed milk after the steam cuts off when target milk temperature has been reached; (5) uses audible alarms to indicate when the milk shuts off and the age of the steamed milk; (6) features an emergency cutoff button 174 on the LCD screen 132 for each station 102, available anytime the steam valve 190 is open; or (7) allows the user to define their own ideal target settings for heat, cutoff age for steamed milk, and safety cold temp which the IR sensor 128 has to sense before steam can flow through the steam wand 112.

In this embodiment, the baristas can increase the efficiency of their multi-tasking because this machine 100 makes it possible to create an inventory of steamed milk. This means the barista is not strictly steaming milk to order. Knowing both the temperature status of milk-in-progress, as a percentage toward its target temp, and the age of completed steamed milk, allows the barista to reach a new level of efficiency and volume in milk steaming and drink making. The barista can keep a constant flow of milk being steamed in-progress to meet the demand of drinks coming into the system. This ability to create work-in-process inventory in an extremely automated manner of highly perishable steamed milk creates incremental value, over what can be done with other machines. This efficiency may result in value equivalent to 1-3 additional employees.

Embodiments of the present invention may also incorporate safety features. For example, a cold/proximity sensing safety feature 162, an IR sensor 128 (FIG. 6) must sense something cold, such as a pitcher 118 or indirectly the milk) before it will allow a user to start the flow of steam through activation of the LCD button controls. As such, the machine 100 includes a temperature sensor as a proximity sensor, essentially forcing that there be milk ready for steaming (i.e., cold/fresh from the fridge) before steam can be released. This can prevent the user from mistakenly steaming milk twice if a finished milk pitcher 118 is already there. Such a mistake could be caused by accidentally touching the wrong button or by mistaking a finished pitcher for a pitcher needing to be steamed. This feature also prevents steaming when no pitcher 118 is present and burning the barista. Hereinafter, this pitcher temperature safety temperature is also referred to as the "CS Temp" 162. Unless a temperature colder than CS Temp 162 is sensed (e.g., a pitcher of cold milk), the controls for starting the steam are shut off. A read out of CS Temp 162 is preferably presented on the display 132 (see FIG. 9B).

In another embodiment, there may be a "physical down" position switch 114 that tells the machine 100 when the elevator 104 is in the down/ready position. This switch 114 is depressed when the elevator 104 is lowered into the down position, ready for operation (FIG. 8). Unless the switch is down, the steam solenoid valve 190 cannot be opened.

In yet another embodiment of the invention, the combination of these two safety features ensures that the user can only control steam through the touchscreen controls if (1) the elevator 104 is in the down position and (2) there is something cold sensed where the pitcher 118 is supposed to be.

In another embodiment, an Adjustable Pitcher Rest 140 (see FIG. 5) extends from the bottom of the elevator 104. When the milk pitcher 118 is in place for steaming against the pitcher locator rods 126, the user lowers the elevator 104 until the Adjustable Pitcher Rest 140 comes into contact with the rim of the milk steaming pitcher 118. As illustrated in the left-hand station in FIG. 8, this rest allows for the micro-calibration of the contact between the tip of the steam wand 122 and the surface of the milk inside the pitcher 118. The precise orientation of the steam wand tip 122 to the milk surface is a critical dimension for the automated production of micro-foamed steamed milk, i.e. micro-foamed milk is impossible to produce without the precise calibration of these dimensions and orientation. As depicted in FIG. 8, the Adjustable Pitcher Rest 140 is manually adjustable by the user and, for example, may be raised or lowered by rotating the threaded rest to achieve the proper setting. Alternatively, the pitcher locator rest 140 may not be adjustable, but may be manufactured with ideal dimensions for locating the steam wand tip 122 against the milk surface.

As previously discussed, the preferred embodiment of the invention is easy to maintain and clean. In some embodiments, this feature results from the combination of the way the pitcher locator rods or devices 126 and pitcher 118 surface and elevator 104 are simply constructed and readily accessible, thus making them easy to wipe down. The maintenance advantage comes from the machine's simplicity and the use of highly durable parts, highly flexible tubing 136, the simple (but highly functional) LCD touchscreen 132, just to name a few reasons.

FIG. 11 illustrates an alternative embodiment of the present invention in which machine 100 utilizes decentralized displays 150 and controls 152. The displays 150 are dedicated to a respective steaming station 102 preferably located below the display 150 on the front of machine 100. Likewise, each control 150, which may be a hard button, is preferably located above a steam station 102 and is associated with that station 102. For ease of understanding, displays operate similarly to the centralized display 130 discussed previously, except that they are steaming station 102 specific. Likewise, the functionality of buttons 152 is similar to that of buttons 134 except that they too are station specific.

The machine 100 depicted in FIG. 11 has the capacity to offer a smaller footprint than a machine with a centralized display and control station 130 (FIG. 1). The machine 100 of FIG. 11 may also provide operational clarity to the user, by providing steam station information adjacent, and in close proximity, to a particular station 102. Both of these features may be advantageous to certain users.

FIG. 12 illustrates a schematic block diagram of a machine 100 according to embodiments of the present invention. A controller 180 receives input from and provides output signals to various components of machine 100. Controller 180 may be a machine-specific computer, such as a PLU, or even part of a networked system. A user provides input to controller 180 through user input 182. Examples of user inputs may include, by way of example, stop, start, purge and temperature instructions, to name a few. Operation-related information is presented on display 184. As discussed previously, the User input and display 184 for multiple steam stations in one machine 100 may be centralized or decentralized.

Boiler system 186 is controlled by controller 180 and is plumbed to steaming stations 102 via flexible tubing 136. A solenoid valve 190 controls steam flow in tube 136 and receives instructions from either of the controller 180 or user input 182. Boiler system 186 may be plumbed to a water supply (not shown). Steam station 102 includes elevator 104 steam wand 112 and steam tip 122 angled to properly froth milk in pitcher 118. A power supply 188 provides power to components of machine 100.

The machine 100 illustrated in FIG. 12 is depicted as having a single steam station 102, for purposes of simplicity and ease of understanding. Accordingly, it is understood that the machine 100 represented in FIG. 12 may comprise multiple steam stations 102 with multiple tubes 136 and solenoid valves 190.

The following table (TABLE 1) depicts a demonstrative use case example, and is not meant to be exhaustive, but rather, serves as an example to better understand the features and benefits of the present invention.

In the following case example, the user is a barista preparing high quality micro-foamed steamed milk for espresso drinks:

TABLE 1

| Barista Does: | Machine Does: |
| --- | --- |
| Barista presses the Purge button and wipes off wand | Solenoid steam valve opens and steam flows from boiler. The flow of steam clears condensed water out of the lines to ready the machine for milk steaming. |
| Barista fills pitcher for use with 16 oz drinks to designated milk volume (fills to level indicator marking inside pitcher) | |
| | The temperature reading for each station is always shown on the screen below each station |
| Puts pitcher for 16 oz drinks with cold milk on machine | IR sensor reads cold temperature. Color or barcode on pitcher indicates the 16 oz size of the pitcher to the color sensor or barcode reader in the machine. Constantly checks if IR sensor registers a temp lower than CS Temp AND that Down Position Switch is depressed. The machine will not allow steam valve to open unless both of these are true. Temp is cold BUT slide is not down. Controls inactive. |
| Lowers Elevator, lowering steam wand into milk. | Down Position Switch is activated. Controls to open steam valve are opened to the Barista. |
| Barista chooses and presses the MID Set Temp button, which aims for an end milk temp of 145 degrees Fahrenheit. | The machine knows it's a 16 oz pitcher and chooses the MID target temp for 16 oz drinks. The solenoid valve opens and allows steam to flow through tubing and steam wand. An emergency STOP button appears in red at the top of the column representing the coincident steam station on the machine. The barista hitting this button will instantly shut the solenoid steam valve. The button representing the Stop Temp chosen remains on screen and changes color to indicate the Stop Temp of that station while steaming is in-progress. The other buttons representing other Stop Temp options disappear from the screen. Current temperature reading is still/always displayed in the column representing coincident steam station. In the same/active column a graphical representation of steaming progress is shown (e.g. a single bar that represents progress by rising from bottom to top to represent the percentage completion of the steam process) Steam wand is precisely positioned. Bent at 25 degrees to vertical Located close to the edge of the pitcher. The tip of the steam wand is near the surface of the milk in the pitcher. |

TABLE 1-continued

| Barista Does: | Machine Does: |
|---|---|
| | The combination of these design facts causes the milk to swirl in the pitcher and forces the right amount of air into the milk at the right time while swirling.<br>IR sensor senses Stop Temp and shuts the solenoid valve controlling the flow of steam. Steam stops.<br>Emergency STOP button disappears and is replaced by a Count-up timer that starts and displays the time elapsed since milk stopped steaming in that steam station.<br>If count up timer reaches CS Temp the timer starts flashing Red to warn the barista that the steamed milk is expired and will have to soon be thrown out. |
| After Set Temp is reached, Barista raises Elevator. | When Elevator rises the Down Position Switch is deactivated, which resets the program and safety features. If the steam valve is open and steam flowing when the barista lifts the elevator, the steam valve immediately closes, stopping the flow of steam.. |
| Barista removes pitcher of steamed milk, pours latte art and conveys finished drinks for delivery to customer.<br>Barista can duplicate this process on any of the available steam stations.<br>Barista can enter an Admin screen by entering the pin code to access the settings page.<br>In the setting page the Barista can set the HIGH, MID, LOW temperatures at which the solenoid steam valve will shut off the flow of steam to the pitcher, the CS Temp and the Milk Expire TM. Debounce time can also be set, which just dictates how quickly the program can act on consecutive inputs. | |

While preferred and alternative embodiments of the invention have been illustrated and described herein, many changes can be made without departing from the spirit and scope of the invention. The various embodiments described above may be combined to provide further embodiments. Aspects may be modified, if necessary, to employ devices, features, methods and concepts of various patents, applications and publications to provide yet further embodiments. Accordingly, the scope of the invention is not limited by the disclosure of the preferred and alternative embodiments. Instead, the invention should be determined entirely by reference to the claims that follow.

What is claimed is:

1. A milk-frothing apparatus comprising:
an elevator configured to be deployed in both an up and down position;
a frothing wand coupled to the elevator, the wand having a first primarily vertical portion proximate with respect to the elevator and a second portion offset at an angle with respect to the first portion and distal with respect to the elevator, wherein the first and second portions are configured such that fluid flows from the first portion to the second portion;
a platform configured to support a frothing container; and
adjustable stops extending from the platform, wherein the adjustable stops position the frothing container so that the frothing wand is in a predetermined position with respect to an inner wall of the frothing container.

2. The milk-frothing apparatus of claim 1, further comprising:
adjustable stops extending from the platform of the milk-frothing apparatus for use with a frothing container, wherein the adjustable stops position the frothing container so that the frothing wands are optimally positioned in reference to the frothing containers' inner walls.

3. The milk-frothing apparatus of claim 1 further comprising a touch screen enabled button having more than one temperature input to control a frothing process.

4. The milk-frothing apparatus of claim 1 further comprising a touch screen enabled button having a count-up post-frothing timer to alert a user that a post-frothing operation is too old to use.

5. The milk-frothing apparatus of claim 1, further comprising an infrared thermal sensor which senses the temperature of the milk and milk pitcher to allow the apparatus to stop steaming at the user-defined time.

6. The milk-frothing apparatus of claim 1, further comprising: measurements and graphic display of the measurements to control a frothing process with touch screen enabled stop button to cease the frothing process.

7. The milk-frothing apparatus of claim 1, further comprising: touch screen enabled buttons having more than one temperature input to control a frothing process.

8. The milk-frothing apparatus of claim 1, further comprising a sensor that measures the steaming heating process via remote monitoring of the external surface of the frothing container.

9. The milk-frothing apparatus of claim 8, further comprising circuitry that confirms that a start condition is met for the presence of a cold pitcher and that the elevator is sufficiently downward in a steaming position before commencement of initiating steam.

10. The milk-frothing apparatus of claim 1 further comprising:
a steam boiler which is hydraulically coupled to the wand via flexible tubing and wherein the wand is configured to travel from an upward stowed status to a downward deployed status to insert the wand into a pitcher.

11. The milk-frothing apparatus of claim 1, wherein a distal portion of the wand is bent at a 25-degree angle to the vertical portion of the elevator-mounted steaming wand, and wherein such distal portion is adjacent to a pair of pitcher locator devices in the downward deployed status.

12. The milk-frothing apparatus of claim 1, further comprising an infrared sensor for remote temperature monitoring of a pitcher during a downward deployed status.

13. The milk-frothing apparatus of claim 1, further comprising a screen with operator controls oriented to coincide spatially with the elevator, indicating different temperature settings selected by the user, displaying a visual representation of the progress of the temperature of milk in a pitcher toward a target temperature.

14. The milk-frothing apparatus of claim 1, further comprising a screen displaying a count-up timer representing the age of milk after a target temperature has been reached.

15. The milk-frothing apparatus of claim 1, further comprising one or more features selected from the following group of features: an audible alarm to indicate when milk shuts off and the age of steamed milk; an emergency cutoff button for each station available anytime a steam valve is open; a screen that allows the user to define their own ideal target settings for heat and cutoff age for steamed milk; and a safety cold temperature which an IR sensor must sense before steam can flow through the wand.

16. The milk-frothing apparatus of claim 1, further comprising a cold/proximity sensing safety feature comprising an IR sensor for sensing something cold, such as a pitcher or indirectly milk, before said sensor will allow a user to start the flow of steam from the apparatus.

17. The milk-frothing apparatus of claim 1, further comprising a physical down position switch that is depressed and indicates to the apparatus when the elevator is in the down/ready position and thereby ready for operation, and unless so depressed, prevents a steam solenoid valve from opening and thereby prevents the steam from entering the wand.

* * * * *